United States Patent [19]
Tange et al.

[11] 3,754,491
[45] Aug. 28, 1973

[54] DELIVERY AND CUTTING APPARATUS FOR TAPE

[76] Inventors: Fumiko Tange, 37-231 Takane, Oaza Okehazama Arimatsu-cho, Midori-ku, Aichi; Kiichi Isuda, 5-7, 2-chome, Tomigooka, Nara, both of Japan

[22] Filed: Oct. 6, 1971

[21] Appl. No.: 187,106

[30] Foreign Application Priority Data
Feb. 24, 1971  Japan.................................. 46/9155

[52] U.S. Cl..................... 83/277, 83/922, 226/158, 226/172
[51] Int. Cl............................................. B26d 5/22
[58] Field of Search..................... 83/276, 277, 258, 83/259, 422, 922, 206; 226/172, 158

[56] References Cited
UNITED STATES PATENTS

| | | | |
|---|---|---|---|
| 3,372,849 | 3/1968 | Hall et al. ........................ | 226/172 X |
| 2,468,619 | 4/1949 | Franke............................. | 83/922 X |
| 3,301,114 | 1/1967 | Joa.................................... | 83/276 X |
| 1,341,184 | 5/1920 | Leumann.......................... | 83/277 X |

*Primary Examiner*—Andrew R. Juhasz
*Assistant Examiner*—James F. Coan
*Attorney*—E. F. Wenderoth et al.

[57] ABSTRACT

A tape delivery and cutting apparatus for delivering and cutting sealing tape for packaging and the like. The apparatus has a connecting bar movable in a vertical direction by a crank. A swing lever is fulcrumed at its center on a vertically movable cylinder, and has one end connected to the upper end of the connecting bar. A pair of endless tape delivery belts is held between the end of the swing lever and a projection arm on the cylinder for delivering tape. A blade extends from the upper end of a blade arm the lower end of which is actuated by a cam fixed to a crank shaft so that the blade projects horizontally near the space between the upper ends of the delivery belts as the moving cylinder moves upwardly. The pair of delivery belts ceases its delivery action as the moving cylinder is moved downward so that a definite length of tape is automatically delivered.

1 Claim, 3 Drawing Figures

3,754,491

INVENTORS

Fumiko Tange
Kiichi Tsuda

INVENTORS
Fumiko Tange
Kiichi Tsuda

DELIVERY AND CUTTING APPARATUS FOR TAPE

This invention relates to a novel cutting apparatus for tape and delivery and cutting means for tapes which is a constituent of a sealing apparatus. Various delivery and cutting apparatuses have been developed but have been found unsuccessful in practical use in tape handling; delivering tape from a tape holder and cutting to a required length has not been satisfactorily attained.

An object of this invention is to provide a tape delivery and cutting apparatus which secures proper cutting as required. Another object is to provide a modified form of a sealing component. Other objects will be apparent from the following description of the invention.

These objects are realized in accordance with the present invention which comprises delivering tape while it is being held between a pair of delivery belts and a cutting apparatus.

The nature of the invention will be more clearly apparent by reference to the following detailed description when taken in connection with the accompanying illustration in which.

Figure 1:
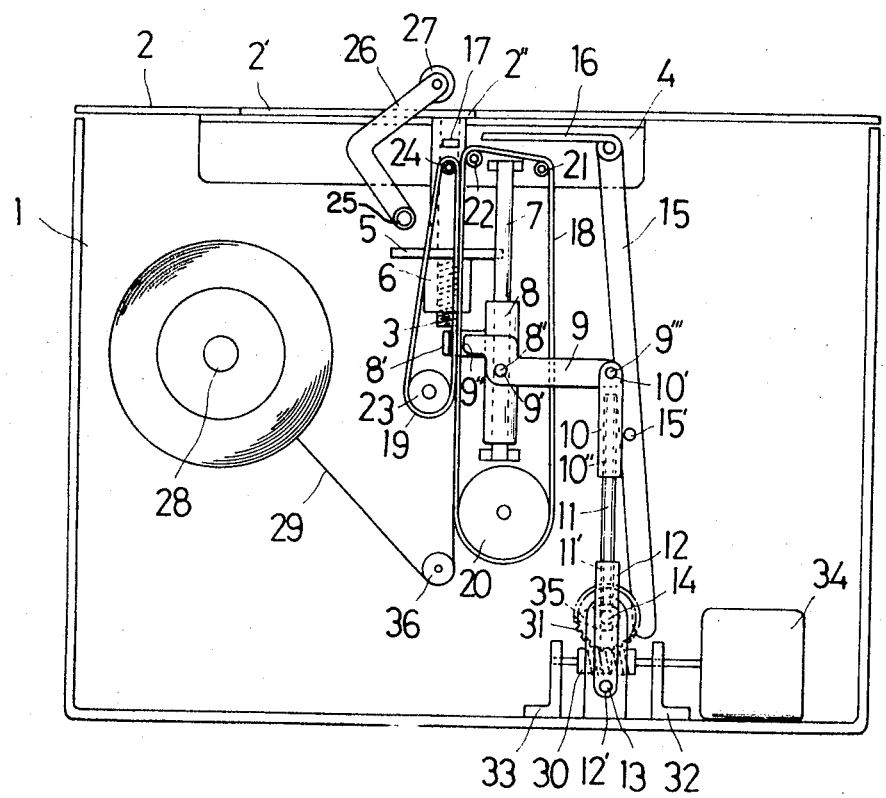
FIG. 1 is a side elevational view, with parts in section, of one of the forms of the apparatus constructed in accordance with the present invention.
Figure 2:
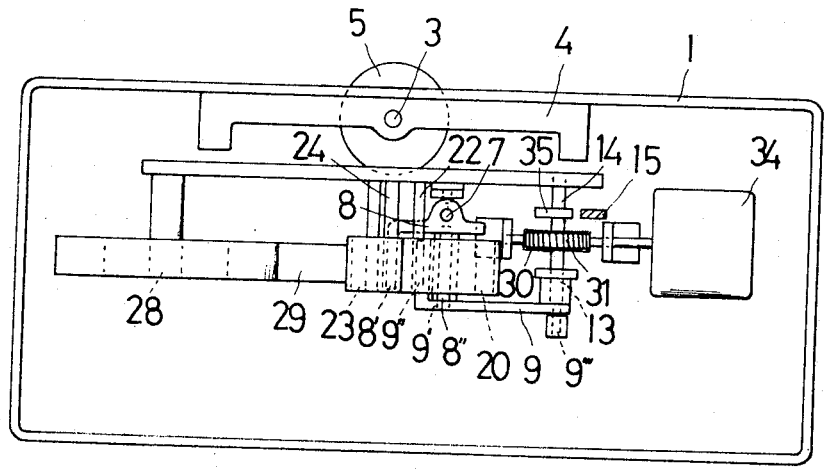
FIG. 2 is a plan view of the essential part of the apparatus.
Figure 3:
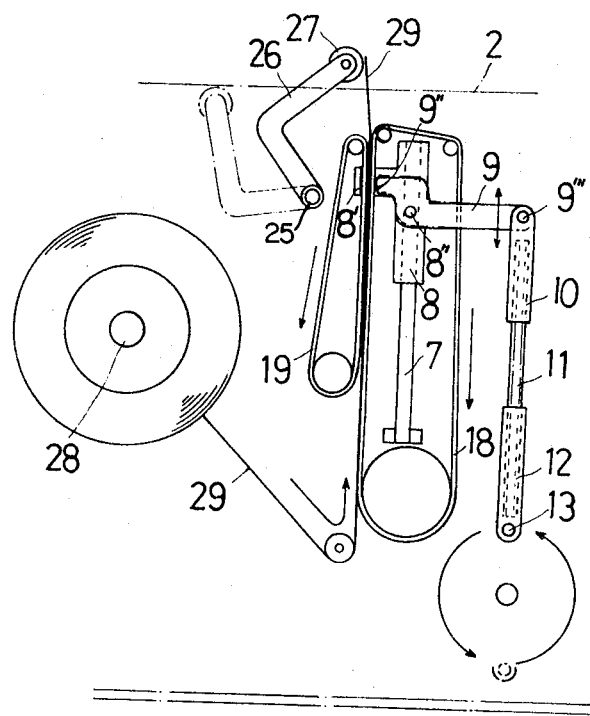
FIG. 3 is a diagrammatic view of parts of the apparatus of FIG. 1 during tape delivery.

Frame 1 is mounted on table 2 and moves freely in a vertical direction. On the underside of said table 2 is fixed a supporting arm 4, from which extends threaded shaft 3 which carries adjusting nut 5. The lower portion of said shaft 3 is supported by bracket 6 fixed to frame 1. Adjusting nut 5 is driven to turn said shaft 3 and said table 2 moves in the vertical direction. Window hole 2' is provided around the center of said table 2, one extremity of which forms the exit for the tape to be delivered. Vertical shaft 7 is fixed to frame 1. Moving cylinder 8 is slidable along said vertical shaft 7 and has a projection arm 8' projecting to one side thereof. Fulcrum shaft 8" on moving cylinder fits in hole 9' of swing lever 9 having a projection, which is provided with a vertical flat portion 9; also moving cylinder 8 has a horizontal projection at one end thereof opposed to and spaced from said vertical flat portion. This forms a vertical holding portion for a pair of delivery belts 18 and 19 to be held between said flat portion 9" and projection arm 8'. Said swing lever 9 has a shaft 9" which fits in hole 10' has the upper end of rod 10. This shaft 9" which is a shreaded hole, which fits in hole 10' most certainly does have an upper end of rod 10. 10" is provided in the lower portion of said rod 10 and has adjusting threaded bar 11 threaded into it, the lower end of bar 11 is attached to bottom cylinder 12. Shaft end 12' of a crank 13 is fixed at its base end to shaft 14 of worm gear 31 and is loosely connected to the lower end of said bottom cylinder. Blade arm 15 is free to swing and is fulcrumed at 15' at its center and the base end of a horizontally movable blade 16 is mounted on the upper end thereof. Cam 35 mounted on the shaft 14 of worm wheel 31 pressess against the lower end of said blade arm 15. An opposing blade 17 is positioned opposite to the blade 16 the end of which is located at the tape feeding line. Endless delivery belt 18 which is capable of holding tape below said blade 17 extends around a larger supporting roller 20 and smaller rollers 21 and 22 thereabove, while the corresponding delivery belt 19 extends around a larger supporting roller 23 and a smaller supporting roller 24 thereabove. Curved sealing roller arm 26 is mounted on supporting shaft 25 at the lower end thereof, while pressure roller 27 is mounted at the upper end and is free to swing so as to project through said window hole 2 in said table 2. Worm 30 is held in bearings 32 and 33, and is attached to motor 34 at one end and the said worm gear 31 engages worm 30.

The primary action obtained according to the invention is as follows: On tape reel supporting shaft 28 which is mounted on one side of frame 1 is placed tape reel 29, the end of the tape is led around tensioned roller 36 to delivery belts 18 and 19 and is inserted between said delivery belt 18 and 19 to secure proper holding of the tape to be delivered. Then, when motor 34 is operated, crank 13 is actuated through worm 30 and worm gear 31. This raises bar 11 and rod 10 connected to said bar 11 is raised and driving shaft 9''' of said rod 10 is pushed up. At this moment, the swing lever 9 turns around the fulcrum shaft 8" on which is equipped moving cylinder 8. This allows the flat portion 9" on said swing lever 9 to be pressed against projection arm 8' that projects from said moving cylinder 8. Thus, the pair of the delivery belts 18 and 19 are securely held in contact between projection arm 8' and said swing lever 9.

Then, rod 10 is raised further as crank 13 is moved further, so that moving cylinder 8 goes upwards on vertical shaft 7 while said delivery belts 18 and 19 are held between said moving cylinder projection arm 8' and lever 9. This feeds said delivery belts 18 and 19 between which the tape is held so that tape is fed from between the upper ends of said delivery belts.

In addition, delivery belts 18 and 19 move apart from each other at their upper end, so that adhesive tape is stripped from the delivery belts, and only the tape 29 is fed in the forward direction.

Then, when crank 13 reaches its upper dead point, and moving cylinder body 8 has reached its upper most position, the cam 35 mounted on said driving shaft 14 moves against the lower end of blade arm 15 which will then be turned around fulcrum 15'. At this moment, the blade 16 attached to the end of said arm 15 is projected across the tape feeding path so that tape 29 is cut by the cutting action of blade 16 and blade 17 as it being fed from the upper ends of the delivery belts 18 and 19. Tape 29 is delivered in a length corresponding to the distance belts 18 and 19 have moved and is adhered on the lower face of passing material to be sealed and sealing roller arm 26 is pressed against the underside of the tape on the material to be sealed so as to secure firm adhesion. The weight of the material to be sealed causes the sealing roller arm 26 to swing around supporting shaft 25 pressing against the underside of said material. Table 2 may be raised by turning adjusting nut 15 projecting from one side of said frame 1, which raises threaded shaft 3. This allows said tape 29 to be sealed against the underside of the material fed.

Thereafter, rod 11 is moved downwards through the action of crank 13 so that said shaft 9''' on said swing lever 9 moves downwards while said flat portion 9" on the other end moves upwards. This ends the tape holding action obtained by the combined action of said delivery belts 18 and 19 with said L-shaped arm 8' and flat portion 9". This means that delivery belts 18 and 19 are disengaged from said moving cylinder 8. Then, rod 11 moves further downwards so that said moving cylinder 8 moves on vertical shaft 7 in the same direction through swing lever 9 which serving as a connecting member capable of lever action. Each time said moving cylinder 8 reciprocates in a vertical direction through the action of worm 30, worm gear 31 and said crank 13 driven by said motor 34, a definite length of tape 29 is delivered onto table 2.

To ensure definite tape feeding a pair of endless delivery belts, between which tape is held are moved by the distance moving cylinder moved by the swing lever actuated in turn by the crank which permits the cylinder to move freely in a vertical direction.

In addition, the pair of delivery belts are arranged to form a V-shaped space at their upper end. This causes the adhesive tape to be stripped from the pair of delivery belts and thus only tape is fed in the feeding direction.

Further, a blade arm operates simultaneously with a shaft which is capable of operating a swing lever to ensure cutting of a defined length of tape.

The invention has the advantage that the apparatus in accordance with the invention is useful not only as a sealing means but also as a cutting apparatus for tape cutting because of its simple and thus compact structure.

What we claim is:

1. In a tape delivery and cutting apparatus, the combination of a vertically movable connecting bar, a crank to which the lower end of said connecting bar is pivotally connected, said crank being adapted to be driven from a drive means, a vertically movable cylinder, a swing lever pivotally mounted on the cylinder and having one end pivotally connected to the upper end of said connecting bar, a pair of endless tape delivery belts adjacent said cylinder and having opposed vertical runs moving in the same direction for drawing tape from a tape supply and feeding it in the direction of the runs, a projection arm on said cylinder extending adjacent the vertical run of one of the belts, the other end of said swing lever being adjacent the vertical run of the other belt on the opposite side of the runs from the projection arm, said swing lever being pivoted to move the other end of said swing lever toward said projection arm when said connecting bar is moved upwardly for gripping the runs of said belts against each other to grip a length of tape therebetween, and being pivoted to move said other end away from said projection arm when said connecting bar is moved downwardly, and a tape cutting blade above said delivery belts, and blade moving means to which said blade is connected for moving said blade transversely across the path along which the tape is delivered for cutting lengths of tape from the tape delivered by said delivery belts, whereby when the connecting bar is moved upwardly, the swing lever is pivoted to move the other end therof toward said projection arm to grip the runs of the delivery belts and move the delivery belts as said cylinder is moved upwardly during continued movement of said connecting bar to move the tape gripped therebetween upwardly, and when the connecting bar is moved downwardly, the swing lever is pivoted to move the said other end away from the projection arm to release the delivery belts, and the cylinder and swing lever move downwardly along the delivery belts without moving the delivery belts.

* * * * *